Figure 1:
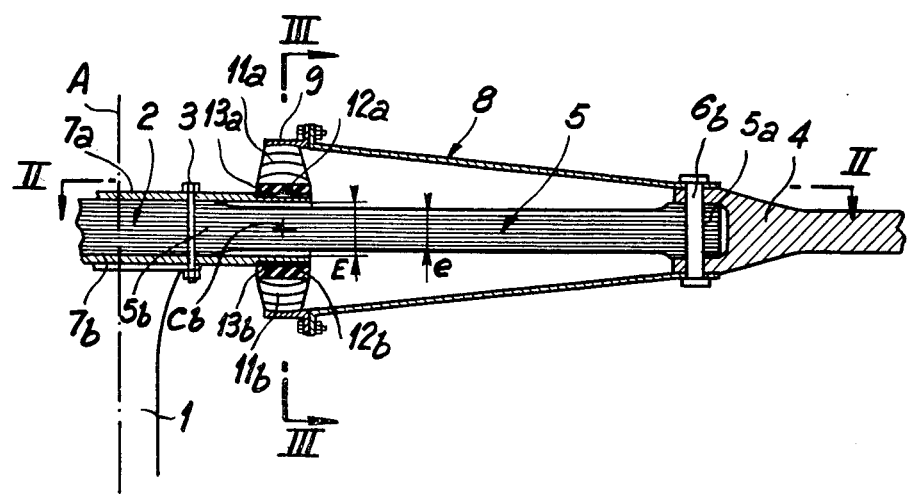

United States Patent [19]

Mouille

[11] 4,222,709
[45] Sep. 16, 1980

[54] VARIABLE-PITCH ROTOR, SPECIALLY FOR A ROTARY-WING AIRCRAFT

[75] Inventor: René L. Mouille, Aix-en-Provence, France

[73] Assignee: Societe Nationale Industrielle Aerospatiale, Paris, France

[21] Appl. No.: 923,433

[22] Filed: Jul. 10, 1978

[30] Foreign Application Priority Data

Jul. 13, 1977 [FR] France .................................. 77 21658

[51] Int. Cl.³ .............................................. B64C 27/38
[52] U.S. Cl. ................................ 416/134 A; 416/141
[58] Field of Search ............... 416/134 A, 136, 138 A, 416/141, 106, 107, 140 A

[56] References Cited

U.S. PATENT DOCUMENTS

| | | | |
|---|---|---|---|
| 2,949,967 | 8/1960 | Jovanovich | 416/141 X |
| 3,231,222 | 1/1966 | Scheutzow | 416/134 A X |
| 3,880,551 | 4/1975 | Kisovec | 416/134 A |
| 4,012,169 | 3/1977 | Mouille et al. | 416/134 A |
| 4,053,258 | 10/1977 | Mouille | 416/134 A |
| 4,086,024 | 4/1978 | Weiland et al. | 416/134 A X |
| 4,087,203 | 5/1978 | Ferris | 416/134 A X |
| 4,093,400 | 6/1978 | Rybicki | 416/134 A X |

Primary Examiner—Everette A. Powell, Jr.
Attorney, Agent, or Firm—Karl W. Flocks

[57] ABSTRACT

The invention relates to a variable-pitch rotor, specially for a rotary-wing aircraft. Each blade of the rotor is connected to the hub by a flexible connecting member comprising a radial bundle of fibres, each agglomerated by a resin and secured together by a vulcanized elastomer. A rigid tubular sleeve surrounds the connecting member without contact thereto. The outer end of the tubular sleeve is secured to the root part of the blade and its inner end is secured to a rigid ring, to which a blade pitch control lever is externally articulated. Spherical ball and socket joint members are inserted between the rigid ring and rigid parts of the rotor hub. Frequency adaptors are associated with the ball and socket joint members.

1 Claim, 3 Drawing Figures

VARIABLE-PITCH ROTOR, SPECIALLY FOR A ROTARY-WING AIRCRAFT

The invention relates to a variable-pitch rotor, specially for a rotary-wing aircraft.

U.S. Pat. No. 3,669,566 describes various embodiments of a variable-pitch rotor for a helicopter. In this variable-pitch rotor, each blade is connected to the rotor hub by an elongated connecting member, mainly comprising a substantially radial bundle of fibres having high mechanical strength, each fibre being agglomerated by a resin and secured to the other fibres by a vulcanized elastomer. Thus, each elongated connecting member is sufficiently flexible to be deformed and to permit beat and drag movements of the corresponding blade and variations in its pitch, thus eliminating the mechanical joints required in conventional rotors for permitting the aforementioned-movements and variation in the pitch of each blade.

There were already constructed numerous main helicopter rotors according to the aforementioned U.S. Patent, which have given excellent results.

However, when main rotors of the aforementioned known kind are applied to light helicopters, they are found to have certain disadvantages specific to this application—for instance insufficient damping of the drag movements of the rotor blades, and coupling between the drag of the blades or the rotor conicity and the blade pitch.

It is known that insufficient damping of blade movements, specially of the blade drag vibrations, of the main rotor of a helicopter results in the following serious disadvantages: there is a serious risk of dangerous phenomena called "ground resonance" and "air resonance" and also dangerous resonance, possibly resulting in excessive stresses on the rotor and hub, when the rotor velocity, as it increases towards its rated value $\Omega$ during starting or decreases from its rated value during stopping, passes through a value near $\omega_\delta$, corresponding to the frequency of the first natural drag vibration mode of each rotor blade.

It is also known that any coupling between (a) the beat of the blades of a main helicopter rotor or the rotor conicity and (b) the blade pitch may result in the following serious disadvantages: during the transition from cruising to stationary helicopter flight, for example, the cyclic pitch control column may move sideways, which is very unpleasant for the helicopter pilot; in such cases, each variation of a step in the rotor blade pitch may produce two different helicopter responses, which introduces a factor of uncertainty in piloting.

A chief object of the invention is variable-pitch rotor, specially for a rotary-wing aircraft, with which the aforementioned disadvantages are eliminated when such a rotor is adapted to a light helicopter as its main rotor.

Another object of the invention is a variable-pitch rotor, specially for a rotary-wing aircraft, comprising a hub, at least one blade and one elongated connecting member, connecting said blade to said hub, said connecting member comprising a substantially radial bundle of fibres having high mechanical strength, each fibre being agglomerated by a resin and secured to the other fibres by a vulcanized elastomer, so that said connecting element is sufficiently flexible to be deformed, to permit beat and drag movements of the blade and variations in its pitch, at least one rigid tubular sleeve disposed in a spaced and surrounding relationship to said connecting member, the outer end of said sleeve being secured to the root part of the blade, a rigid ring which is secured to the inner end of said sleeve and to which a blade pitch control lever is externally articulated; and spherical ball and socket joint members inserted between said rigid ring and rigid parts of said hub, and frequency adaptors, each associated with one of said ball and socket joint members.

Still another object of the invention is to design a rotor specially for a rotary-wing aircraft wherein the blade movements, and specially the blade drag vibrations are strongly damped by plates of an elastomer having high hysteresis, which are subjected to shearing stress by the aforementioned blade movements or vibrations, thus eliminating the aforementioned resonance phenomena and the resulting risks of excessive stresses on the rotor blades and hub.

Still another object of the invention is to design a rotor, specially for a rotary-wing aircraft, wherein the position of the beat axis of each blade is accurately determined by ball and socket joint members, specially at the centre of the ball and socket joint which they define, this resulting in the substantial elimination or easy control of any coupling between the rotor blade pitch and the beat of the blades or the conicity of the rotor.

The rotor according to the invention has the following additional advantage: when a rotor such as described in the aforementioned U.S. Pat. No. 3,669,566 stops, each flexible connecting member is deformed into an S by the weight of the corresponding blade. This S deformation is very harmful to the flexible connecting member since it may result in "decohesion" between the fibres and the vulcanized elastomer joining them together. This is the main reason why it is impossible to increase the aerodynamic efficiency of this known rotor connecting member, e.g. by increasing its length or reducing its cross-section, as would be desirable to reduce the considerable force required, with this kind of rotor, to modify the pitch of each blade, by twisting the corresponding connecting member. With the rotor according to the invention, this limitation is substantially eliminated specially because the weight of each blade is supported not only by the flexible connecting members but also by the rotor hub, since the torque resulting from the blade weight is transmitted to the rigid parts of the hub by the rigid tubular sleeves and the ball and socket joint members. It is thus possible to reduce the force required for varying the pitch of each blade and simultaneously increase the aerodynamic efficiency of the corresponding connecting member, e.g. by increasing its length and/or reducing its cross-section, without the said connecting member, after the rotor stops, being subjected to a so important S deformation that it reduces the cohesion of the various fibres of the connecting member.

A last object of the invention is a rotor of the type described wherein the bundles of fibres of the connecting members of at least two blades are parts of a single bundle of fibres having at least one intermediate part incorporated in the rotor hub, the thickness of said hub perpendicular to the rotor plane being slightly greater than the thickness of said connecting members, and the rigid parts of the hub bearing said spherical ball and socket joint members are rigid metal plates, which are secured to the top and bottom surfaces of the hub respectively and which extend radially in a spaced relationship to both faces of each elongated radial connecting member, over a predetermined fraction of the length of said connecting member.

In the last-mentioned embodiment of the rotor according to the invention, the centre of each spherical ball and socket joint—through which the beat axis of the corresponding blade passes—is in the corresponding flexible connecting member near its inner end. This embodiment is particularly advantageous because on one hand the rigid metal plates secured to the hub form solid bearings for the ball and socket joint members and the associated frequency adaptors, and on the other hand the said metal plates form with the frequency adaptors an assembly or unit which can be separated from the rotor hub body, thus greatly facilitating the maintenance of the rotor.

Figure 2:
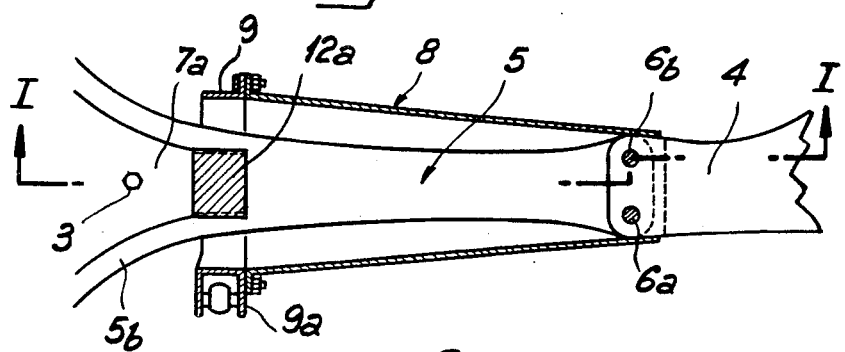
Figure 3:
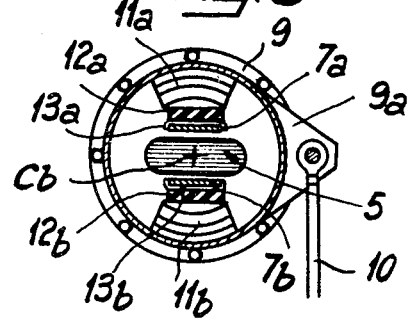

By way of example, the following is a description, diagrammatically illustrated in the accompanying drawing, of a preferred embodiment of a main helicopter rotor according to the invention. In the drawings:

FIG. 1 is a partial view of the embodiment, in section through a plane extending through the rotor axis and the longitudinal axis of the blade, and FIGS. 2 and 3 are sectional views along lines II—II and III—III respectively of FIG. 1.

In FIG. 1, reference 1 denotes the top end of the rotor shaft, to which a rotor hub 2 is secured by any appropriate means, for instance by holts 3 which extend through its parallel to the rotor axis A. The rotor can have any number of blades; the drawing shows the fork-shaped root 4 of one blade only. Each blade root 4 is connected to the rotor hub 2 by a connecting member 5 (compare FIG. 2) which mainly comprises a substantially radial bundle of fibres having high mechanical strength each fibre being agglomerated by a resin, specially a synthetic resin and secured to the other fibres by a vulcanized elastomer as disclosed in the aforementioned U.S. Pat. No. 3,669,566. In the embodiment shown, the outer end 5a of member 5 is slightly thicker than the central part of element 5, it fits between the two prongs of the fork formed by root 4 and is connected thereto by two pins 6a and 6b. Moreover the bundles of fibres forming the connecting member (e.g. 5) of two adjacent rotor blades (e.g. 4) are parts of a single bundle of fibres, the central part of which is incorporated in hub 2 to form the hub body 5b. The thickness of body 5b perpendicular to the rotor plane, i.e. in the direction parallel to its axis A, is slightly greater (E in FIG. 1) than the thickness e of the central part of the connecting element 5 of each blade 4. The intermediate parts of the bundles forming the connecting elements 5 can be incorporated in metal components (not shown) forming a sort of casing for the hub body. The illustrated embodiment shows only a pair of rigid plates, for instance two metal plates 7a and 7b, one being secured to the top and the other being secured to the bottom surface of the hub body, by the aforementioned holts 3, the said plates extending in a spaced relationship to upper and lower faces of each connecting member 5. The number of pairs of rigid plates can be equal to the number of rotor blades; in the preferred embodiment illustrated, however, there is only a single pair of rigid plates 7a, 7b, each being star-shaped and having a number of arms equal to the number of blades.

The fibres of each connecting member 5 can consist of bundles of continuous glass filaments, e.g. a few microns in diameter, each fibre comprising thousands or tens of thousands of the aforementioned single glass filaments to make up a cross-section of a few square millimeters. In each fibre, the filaments are agglomerated by a polymerised resin, preferably epoxy. In some cases, use can also be made of carbon or boron filaments, which have a much higher elasticity modulus, or any other material having suitable characteristics. In the central part of the connecting member 5, the fibres are secured together by a vulcanized elastomer, so as to hold them together in a single composite bundle. The elastomer is relatively flexible and adheres firmly to the fibres, which may be surface-treated to increase the adhesion. The elastomer is chosen so that its shear modulus is sufficiently weak for the fibres to make small relative movements, and so that it has one remanence on deformation (hysteresis), so that energy is absorbed whenever the material is deformed. On the other hand, in the end 5a of each connecting member 5, the fibres are agglomerated by a polymerized (i.e. rigid) resin which has a very high shear modulus, so that the loads applied to the corresponding blade are transmitted to the fibres and distributed among them. The resin may also be, e.g. an epoxy resin, for instance of the same kind as that by which the filaments are agglomerated. A connecting member 5 having the aforementioned structure can be moved with three degrees of freedom with respect to any body connected to its inner end, i.e. with respect to the rotor hub 2. These various movements are brought about by deforming the central part of element 5, the fibres of which very elastically in length, whereas the elastomer undergoes elasto-static distortion. As a result of the three degrees of freedom of each connecting member 5 of a blade 4, the said member 5, can be deformed so as to permit beat and drag movements of the corresponding blade and variations in its pitch. The beat and drag movements of blade 4 are obtained by bending the inner end of the corresponding member 5 along axes in the planes of FIGS. 2 and 1 respectively, whereas variations in the pitch of blade 4 are brought about by twisting the corresponding member 5 around its longitudinal axis. In each case, as a result of the remanence of deformation of the elastomer in the bundle of fibres forming member 5, the movement of the corresponding blade 4 is some what damped. As previously stated, however, this damping has been found insufficient for some movements, for instance for drag vibrations, in the case of the main rotor of a light helicopter, in which the connecting member 5 must necessarily have a reduced width (in the plane of FIG. 2). Of course, as shown in FIGS. 1 and 2, each member 5 can have variations in thickness (in the plane of FIG. 1) and/or width (in the plane of FIG. 2), which can be chosen so as to give suitable values to the frequencies of the natural beat and drag vibration modes of each rotor blade.

According to the invention, each connecting member 5 of a rotor blade 4 is surrounded without contact, up to near the hub 2, by a rigid tubular sleeve 8, the outer end of which is rigidly secured to the root part of the corresponding blade 4 whereas its inner end is secured to a rigid (e.g. metal) ring 9. As shown in the sectional view in FIG. 3, the rigid ring 9 has an external lateral lug 9a in which a blade pitch control lever 10 is externally pivoted. Inside ring 9, spherical ball and socket joint members 11a, 11b are secured on either side of the connecting member 5. In known manner, joint members 11a, 11b may comprise a stack of laminations in the form of spherical caps and made alternately of metal and of an usual elastomer. Substantially rectangular plates 12a, 12b are inserted between joint members 11a, 11b and the ends of the rigid plates 7a, 7b and are made of an elastomer having great rigidity and high hysteresis. The major surfaces of plates 12a, 12b are secured by vulcanization to joint members 11a, 11b on one side and to metal plates 13a, 13b on the other side, plates 13a, 13b being also secured to the ends of plates 7a, 7b.

Plates 12a, 12b, which are made of an elastomer having great rigidity and high hysteresis, constitute viscoelastic effect frequency adaptors of the type described in French Pat. No. 69.35410. Plates 12a, 12b act as return springs, owing to their elasticity, and also act as shock-absorbers, owing to the great hysteresis of the elastomer of which they are made.

In the described embodiment, the position of the beat axis of each blade 4 (the trace of this axis is the planes of FIGS. 1 and 3 is denoted by Cb) is determined by joint members 11a, 11b in the corresponding connecting member 5; in this preferred embodiment joint members 11a, 11b are arranged so that the centre Cb of the spherical ball and socket joint is substantially on the longitudinal axis of the connecting member 5.

Moreover each blade 4 is allowed to beat by the bending of the connecting member 5 in a vertical plane extending through the rotor axis A. Bending is also permitted because of the small gaps between (a) the bottom and top surfaces of the connecting member 5 and (b) the ends of plates 7a, 7b. Another effect of the beat of each blade 4 is that the rigid sleeve 8 and the rigid ring 9 secured thereto transmit deformation forces to both elastic systems comprising joint members 11a, 11b and plates 12a, 12b, since one elastic system is compressed and the other is extended by the said forces.

Similar considerations apply to the drag movements of each blade 4 which occur when the rigid sleeves 8, 9 transmit shear forces to both elastic systems 11a–12a and 11b–12b. Plates 12a, 12b oppose these shear forces with elastic return torques and also with shock-absorbing torques, due to the great hysteresis of the elastomer of which they are made. The shock-absorbing torques greatly damp down the drag movements, specially the drag vibrations of each blade 4, resulting in the previously-mentioned advantages.

Finally, the torque applied by the pitch-changing control lever 10 to the lateral lug 9a of ring 9 is transmitted by the rigid tubular sleeve 8 to the root of blade 4, so that the said blade 4 pivots around its longitudinal axis and twists the corresponding connecting member 5 around its own longitudinal axis. As previously stated, the elastic return torque with which the connecting member 5 opposes the pitch-changing control torque can be reduced according to the invention by reducing the rigidity of the said member 5, e.g. by increasing its length or reducing its cross-section, without any risk of said member 5 being damaged by the weight of blade 4 when the rotor stops.

The invention is not restricted to the aforementioned embodiment but includes all variant. For example the plates of very rigid elastomer having high hysteresis—i.e. the main constituents of the frequency adaptors—need not be inserted between plates 7a, 7b and joint members 11a, 11b but instead can be shaped so as to be incorporated in the said members 11a, 11b. In this manner, each joint member 11a, 11b can be given a very low rigidity with which it opposes a drag of the corresponding blade; this increases the torsional flexibility of the said joint members 11a, 11b i.e. this reduces the rigidity with which each joint member opposes a pitch-control torque transmitted by the corresponding rigid ring 9. In a variant (not shown) joint members 11a, 11b and the associated frequency adaptors are directly secured to the thick, rigid central part of hub 2, with or without interposition of rigid plates 7a, 7b, in which case the beat centre Cb of the corresponding blade is transferred to the thick central part of hub 2.

We claim:

1. A variable pitch rotor, specially for a rotary-wing aircraft, comprising a hub, at least one blade and one elongate connecting member, connecting said blade to said hub, said connecting member comprising a substantially radial bundle of fibres having high mechanical strength, each fibre being agglomerated by a resin and secured to the other fibres by a vulcanized elastomer, so that said connecting member is sufficiently flexible to be deformed, to permit beat and drag movements of the blade and variations in its pitch, at least one rigid tubular sleeve disposed in a spaced and surrounding relationship to said connecting member, the outer end of said sleeve being secured to the root part of the blade, a rigid ring which is secured to the inner end of said sleeve and to which a blade pitch control level is externally articulated, spherical ball and socket joint members inserted between said rigid ring and rigid parts of said hub, and frequency adaptors, each associated with one of said ball and socket joint members, said ball and socket joint members essentially consisting of laminated elastomer, said frequency adaptors essentially comprising plates of elastomer having great rigidity and high hysteresis, said frequency adaptor plates inserted between said spherical ball and socket joint members and said rigid parts of said hub, said ball and socket members essentially comprising laminated elastomer and said frequency adaptor plates respectively incorporated in said ball and socket joint members, said bundles of fibres of said connecting members of at least two blades being parts of a single bundle of fibres having at least one intermediate part incorporated in the rotor hub, the thickness of said hub perpendicular to the rotor plane being slightly greater than the thickness of said connecting members, and the rigid parts of the hub bearing said spherical ball and socket joint members being rigid metal plates, which are secured to the top and bottom surfaces of the hub respectively, and which extend radially in a spaced relationship to both faces of each elongate radial connecting member over a predetermined fraction of the length of said connecting member.

* * * * *